Figure 1:
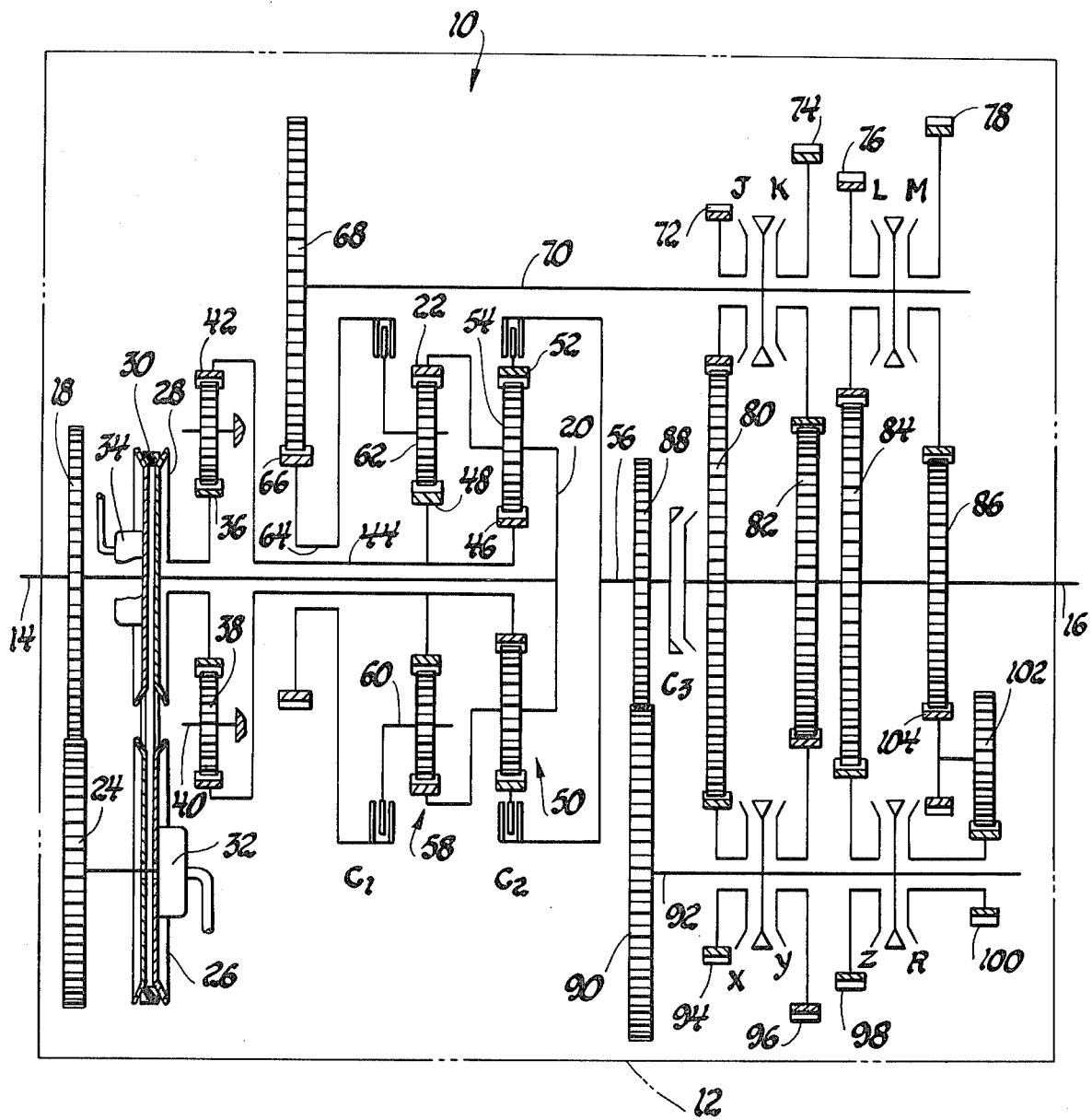

United States Patent [19]

Schmidt

[11] Patent Number: 4,470,326
[45] Date of Patent: Sep. 11, 1984

[54] POWER TRANSMISSION

[75] Inventor: Michael R. Schmidt, Carmel, Ind.

[73] Assignee: General Motors Corporation, Detroit, Mich.

[21] Appl. No.: 446,716

[22] Filed: Dec. 3, 1982

[51] Int. Cl.³ .................... F16H 37/00; F16H 3/08; F16H 37/08; F16H 37/06

[52] U.S. Cl. .................... 74/689; 74/331; 74/359; 74/701; 74/705

[58] Field of Search .............. 74/689, 745, 681, 701, 74/700, 694, 705, 665 B, 665 E, 665 L, 687, 674, 331, 360, 359, 710

[56] References Cited

U.S. PATENT DOCUMENTS

| | | | |
|---|---|---|---|
| 2,833,160 | 5/1958 | Morgan | 74/687 |
| 3,031,893 | 5/1962 | Doleschalek | 74/745 X |
| 3,340,749 | 9/1967 | Magg et al. | 74/689 |
| 3,375,733 | 4/1968 | Browning | 74/689 |
| 3,470,769 | 10/1969 | Livezey | 74/687 X |
| 3,479,908 | 11/1969 | Kress et al. | 74/689 X |
| 3,527,119 | 9/1970 | Nasvytis | 74/689 X |
| 4,089,237 | 5/1978 | Scholz | 74/681 |

FOREIGN PATENT DOCUMENTS

| | | | |
|---|---|---|---|
| 64612 | 11/1982 | European Pat. Off. | 74/359 |
| 916511 | 7/1954 | Fed. Rep. of Germany | 74/689 |
| 898549 | 4/1945 | France | 74/689 |
| 49459 | 5/1981 | Japan | 74/689 |

Primary Examiner—Allan D. Herrmann
Assistant Examiner—Stephen B. Andrews
Attorney, Agent, or Firm—Donald F. Scherer

[57] ABSTRACT

A power transmission has a variable belt drive, a two-speed planetary gear arrangement and a countershaft type gear arrangement disposed in combination to provide a continuously variable synchronously shifting transmission. The planetary gear arrangement and the variable belt drive are disposed in parallel drive relationship thereby reducing the belt load. The planetary gear arrangement has two output members selectively connectible via clutches with respective countershafts in the countershaft type gear arrangement. The countershafts support selectively engageable ratio gears which mesh with respective drive gears on the transmission output shaft in a manner to provide pairs of identical gear ratios between the shafts such that ratios on each countershaft may be simultaneously engaged and the output clutches of the planetary gear set can be interchanged at a synchronous speed point to permit a ratio change. Speed change within any given gear ratio is provided by controlling the ratio of the belt drive. In one gear ratio, the output speed of the belt drive is increased to provide an increased transmission speed while in the next succeeding ratio, the output speed of the belt drive is decreased to provide an increase in the transmission output speed. The transmission is usable with a constant speed prime mover to provide a continuously variable speed range for a vehicle which is greater than the continuously variable speed range for any given speed ratio.

3 Claims, 2 Drawing Figures

POWER TRANSMISSION

This invention relates to power transmissions and more particularly to such transmissions having a continuously variable range with synchronous shifting ratios within the continuously variable range.

It is an object of this invention to provide an improved power transmission wherein a variable ratio belt drive is disposed in parallel drive arrangement with a two-speed planetary gearing such that the output speed thereof is controlled in infinite steps over a predetermined range and wherein the output of the planetary gear set is selectively connected to drive a pair of countershafts having ratio gears thereon disposed in pairs and meshing with respective output gears on the transmission output shaft to extend the speed range of the transmission to a range greater than the belt drive variability while not directing all of the engine power through the belt drive.

It is another object of this invention to provide an improved power transmission having a continuously variable belt drive and a planetary gear arrangement disposed in parallel drive and adapted to selectively drive a pair of countershafts having ratio gears thereon and wherein the interchange between countershafts is synchronous and also wherein a ratio gear on both countershafts may be engaged prior to the interchange between countershafts.

Figure 2:
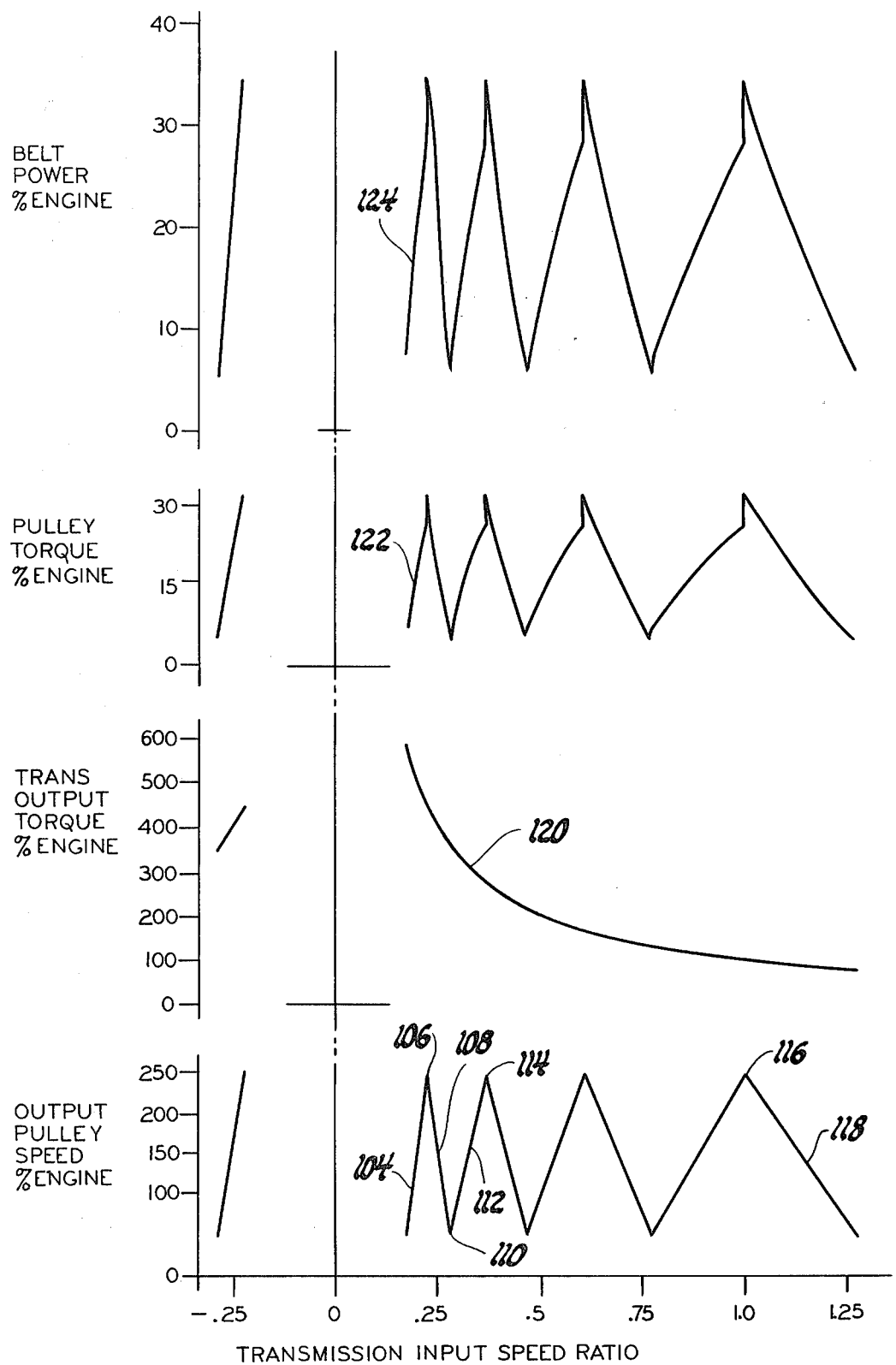

These and other objects and advantages of the present invention will be more apparent from the following description and drawings wherein:

FIG. 1 is a schematic representation of the transmission incorporating the present invention; and FIG. 2 is a plurality of curves depicting the relationships between some of the belt and transmission operating characteristics and the transmission speed ratio.

Referring to the drawings, there is seen in FIG. 1 a transmission, generally designated 10, disposed within a housing represented by phantom line 12. The transmission 10 has an input shaft 14 and an output shaft 16, both of which are rotatably disposed in the housing 12. The input shaft 14 has drivingly connected thereto a spur gear 18 and a planet carrier 20. The planet carrier 20 is drivingly connected to a ring gear 22.

The spur gear 18 meshes with a spur gear 24 which is drivingly connected to a variable ratio pulley 26. The pulley 26 is connected to a variable ratio pulley 28 through a drive belt 30. The ratio between the variable pulleys 26 and 28 is controlled by controlling the space between the sheaves of the respective pulleys. The sheave position can be controlled by hydraulic cylinders, such as 32 and 34. With this type of a control, hydraulic pressure in one cylinder will control the tension within the belt while the hydraulic pressure within the other cylinder will control the ratio between the pulleys. These types of controls are well-known. It is also possible to use a spring member on one sheave and a hydraulic member on the other sheave. Various other control possibilities are available and will be readily apparent to those skilled in the art.

The pulley 28 is drivingly connected to a sun gear 36 which meshes with a plurality of pinions 38 rotatably supported on a fixed carrier 40. The pinions 38 also mesh with a ring gear 42 which is drivingly connected to a sleeve shaft 44. The sleeve shaft 44 has drivingly connected thereto a pair of sun gears 46 and 48.

The sun gear 46 and carrier 20 are components in a planetary gear arrangement, generally designated 50, which also includes a ring gear 52 and a plurality of planet pinions 54 which are rotatably mounted on carrier 20 and mesh with sun gear 46 and ring gear 52, respectively. The ring gear 52 is drivingly connected to a selectively operable clutch $C_2$ which, when engaged, will provide a drive connection between ring gear 52 and a planetary output shaft 56.

The sun gear 48 and ring gear 22 are components in a planetary gear set, generally designated 58, and also includes a carrier 60 on which is rotatably mounted a plurality of pinion gears 62 which mesh with the sun gear 48 and ring gear 22. The carrier 60 is connected with a selectively engageable clutch $C_1$ which, when engaged, provides a drive connection between carrier 60 and a planetary output shaft 64.

The transmission input shaft 14 will continuously rotate the carrier 20 and ring gear 22 in one direction and at a constant speed. The belt drive, consisting of pulleys 26 and 28, will rotate the sun gears 46 and 48 in the same direction as input shaft 14 but at a variable speed depending upon the ratio between the pulleys 26 and 28. The speed components of sun gear 48 and ring gear 22 are additive to drive the carrier 60. Thus, as the speed of sun gear 48 increases, the speed of carrier 60 and therefore planetary output shaft 64, if clutch $C_1$ is engaged, will increase.

The carrier 20 provides a drive component to the ring gear 52 in the same direction as input shaft 14 while the sun gear 46 provides a drive component in the opposite direction to ring gear 52. Thus, as the speed of sun gear 46 increases, the speed of ring gear 52 will decrease and conversely, if the speed of sun gear 46 decreases, the speed of ring gear 52 will increase. The sun gear 46 is a rotating reaction member.

The two planetary gear sets 50 and 58 combine with the variable belt drive to provide a drive arrangement wherein two output shafts are provided, both of which are operable through a variable speed range controlled by the drive ratio within the variable pulley system. By judicious selection of the number of teeth on the various gear arrangements, the speed of the two output shafts 56 and 64 can be made to be identical when the ratio of the pulley system is controlled to provide a maximum speed at sun gears 46 and 48. When the variable pulley system is controlled to provide the minimum speed at sun gears 46 and 48, there will be a predetermined speed ratio between the output shafts 56 and 64 such that the output shaft 56 will be rotating faster than the output shaft 64.

The input shaft 14 is preferably operated at a fixed speed and driven by a governed prime mover, not shown, such as a diesel engine or a gas turbine engine. To accelerate the input shaft 14 as the engine progresses from idle to the governed speed, a selectively engageable clutch arrangement, not shown, may be provided between the engine and input shaft 14. Drive arrangements other than selectively engageable clutches can be used and those skilled in the art will recognize when and where such other devices could be best utilized.

The planetary output shaft 64 is drivingly connected to a spur gear 66 which meshes with a spur gear 68. The spur gear 68 is drivingly connected to a countershaft 70 which supports a plurality of ratio gears 72, 74, 76 and 78. These ratio gears are selectively connectible with the countershaft 70 by respective synchronizers or mechanical clutches J, K, L and M. The ratio gears 72, 74, 76 and 78 are meshed with drive gears 80, 82, 84 and 86, respectively, which drive gears are drivingly connected to the transmission output shaft 16.

The planetary output shaft 56 is drivingly connected to a spur gear 88 which meshes with a spur gear 90. The spur gear 90 is drivingly connected with a countershaft 92 on which is rotatably supported a plurality of ratio gears 94, 96, 98 and 100. The ratio gears 94, 96, 98 and 100 are selectively connectible with the countershaft 92 through the selective engagement of synchronizers or mechanical clutches X, Y, Z and R, respectively. Mechanical clutch R and Clutch $C_2$ are engaged when reverse drive is desired. When clutch R is engaged, ratio gear 100 meshes with idler gear 102 which is drivingly connected with idler gear 104 which in turn meshes with drive gear 86. The idler gear arrangement provides for a reversal of drive between countershaft 92 and output shaft 16. The other mechanical clutches and respective ratio gear will provide forward drive ratios.

A selectively engageable clutch $C_3$ is disposed between planetary output shaft 56 and the transmission output shaft 16 such that a drive path bypassing the countershafts 70 and 92 can also be provided. The number of teeth on gears 94 and 72 are identical as are the number of teeth on gears 74 and 96 and gears 76 and 98.

Assuming that the variable belt drive is disposed to be at the minimum ratio, the clutch $C_1$ and mechanical clutch J are engaged, the transmission will be conditioned for first gear. Also assuming that the input shaft 14 has been brought up to the governed speed of the prime mover, the ratio within the belt drive can be increased so that the speed of sun gear 48 will increase in accordance with line 104 shown in FIG. 2.

Since the clutch $C_2$ is disengaged, the transmission output shaft 56 is free to rotate and can be driven through the engagement of mechanical clutch X. Both clutches J and X are simultaneously engaged. When the speed of pulley 28 and therefore sun gear 48 reaches a maximum, as shown at point 106 in FIG. 2, the planetary output shafts 56 and 64 will be rotating at identical speeds such that clutches $C_1$ and $C_2$ can be simultaneously engaged. After engagement of clutch $C_2$, clutch $C_1$ is disengaged and the drive ratio within the belt system can be decreased along line 108 in FIG. 2. Decrease in the speed of sun gear 46 caused by the belt ratio change will result in an increase in the speed of planetary output shaft 56 and a corresponding increase through ratio gear 94, drive gear 80 and the speed of the transmission output shaft 16.

When the clutch $C_1$ is disengaged, the countershaft 70 is free to rotate independently of the planetary gear arrangement such that mechanical clutch J can be disengaged and mechanical clutch L can be engaged.

When the sun gear 46 is at a minimum speed, the output shaft 56 is rotating faster than the carrier 60. With the mechanical clutch L engaged, the output shaft 64 is driven by the drive gear 84 through ratio gear 46. The speed of output shaft 64 is the same as the speed of carrier 60 at this point which is represented at 110 in FIG. 2. Therefore, the clutch $C_1$ can be engaged with the slip occurring between the clutch components.

After clutch $C_1$ is engaged, clutch $C_2$ can be disengaged as can mechanical clutch X. The transmission is now conditioned for the third ratio such that the speed of output shaft 16 can be increased by increasing the speed of sun gear 48 in accordance with the relationship shown by line 112 of FIG. 2. The countershaft 92 is now free to rotate relative to ring gear 52 such that mechanical clutch Z can be engaged.

When the speed of sun gear 48 reaches a maximum, as indicated at point 114, output shaft 56 and ring gear 52 will be rotating in unison thereby permitting engagement of clutch $C_2$ and disengagement of clutch $C_1$. After this clutch interchange, a reduction in the speed of sun gear 46 as controlled by the belt drive, will result in an increase in the speed of transmission output shaft 16. The above is a description of the operation during the fourth ratio of the transmission.

The fifth ratio operation is the same as first and third and occurs when clutch $C_1$ and mechanical clutch K is engaged. The sixth ratio is achieved through the cooperation of clutch $C_2$ and mechanical clutch Y and the seventh ratio is achieved through the cooperation of clutch $C_1$ and mechanical clutch M. The upper end of the seventh range occurs at point 116 in FIG. 2. When this output speed is achieved, the planetary output shaft 56 is connected via clutch $C_3$ to the transmission output shaft 16. At this time, the ring gear 52 is rotating at a speed equal to that of planetary output shaft 56 so that clutch $C_2$ can be synchronously engaged. After clutch $C_2$ is engaged, clutch $C_1$ is disengaged. The speed of sun gear 46 is thereafter reduced in accordance with line 118 resulting in an increase in the speed of transmission output shaft 16.

The interchanges from fourth to fifth, fifth to sixth and sixth to seventh ratios are similar to that described above for the interchanges between first and second, second and third and third and fourth. It is seen that the odd numbered ratios; i.e., first, third, fifth and seventh are in countershaft 70 while the even numbered ratios; i.e., second, fourth and sixth are on the countershaft 92. It should also be noted that the gear ratio of 72 to 80 and 94 to 80 are identical. Also, the gear ratio of 74 to 82 and 96 to 82 are identical. The ratio of gear 76 to 84 and gear 98 to 84 are identical and the ratio between gear 78 and 86 is identical with the speed ratio which exists between ring gear 52 and carrier 60 at point 116 in FIG. 2. This same speed ratio identity occurs between second and third and fourth and fifth ratios. It is the selection of these values which permits the synchronous shifting of the transmission between ratios.

It is seen in FIG. 2 that the transmission output torque follows a substantially continuous curve represented by line 120, while the pulley torque and belt power characteristics follow a sawtooth curve, as shown in curves 122 and 124, respectively. It should be noted that the belt power never exceeds 40% of the engine power and the maximum pulley torque is slightly greater than 30% of the engine torque. This permits the use of smaller components in the belt drive than would otherwise be necessary if maximum engine power had to be utilized.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A power transmission comprising in combination; an input shaft; an output shaft; a twospeed planetary gear arrangement having two simple planetary gear sets, one of said gear sets having two input members and one output member and the other of said gear sets having an input member, a rotating reaction member and an output member, one input member of each planetary gear set connected with the input shaft; a variable ratio belt drive means connected between the input shaft and the remaining input member and the reaction member; a pair of countershafts rotatably supporting a plurality of respective odd and even numbered ratio drive gears; a plurality of output gears rotatable with said output shaft and each meshing with respective drive gears on both of said countershafts; first selectively engageable clutch means for connecting the output member of the one planetary gear set with the countershaft supporting the odd numbered ratios; second selectively engageable clutch means for connecting said output member of the other planetary gear set to the countershaft supporting the even numbered ratios; and a plurality of engaging means for providing a selective connection between the drive gears and the respective supporting countershaft, said variable belt drive means being controlled to provide an increase in the speed of the output shaft upon an increase in speed ratio therein during operation of the odd numbered ratios and also an increase in the speed of the output shaft upon a decrease in the speed ratio therein during operation of the even numbered ratios.

2. A power transmission comprising in combination; an input shaft; an output shaft; a two-speed planetary gear arrangement having two simple planetary gear sets, one of said gear sets having two input members and one output member and the other of said gear sets having an input member, a rotating reaction member and an output member; shaft means for continuously connecting the input shaft to one input member of the one planetary gear set and to the input member of the other planetary gear set; a variable ratio belt drive means continuously connected between the input shaft and the other input member of the one planetary gear set and the reaction member of the other planetary gear set; a pair of countershafts rotatably supporting a plurality of drive ratio gears; a plurality of output gears rotatable with said output shaft and meshing with respecting drive ratio gears on each of said countershafts with the drive ratio gears being selectively connectible with the respective countershafts to establish a plurality of odd numbered ratios between one countershaft and the output shaft and a plurality of even numbered ratios between the other countershaft and the output shaft with the ratio of each odd numbered ratio and the subsequent even numbered ratio being numerically identical; first selectively engageable clutch means for connecting the output member of the one planetary gear set with the countershaft supporting the odd numbered ratios; second selectively engageable clutch means for connecting said output member of the other planetary gear set to the countershaft supporting the even numbered ratios; and a plurality of synchronizer means for providing the selective connection between the drive gears and the respecting supporting countershaft to selectively engage the odd and even numbered ratios, said variable belt drive means being controllable to provide an increase in the speed of the output shaft upon an increase in speed ratio therein when said input shaft is rotated at a fixed speed, said first clutch means being engaged and one of said odd numbered ratios being engaged by the respective synchronizer, and said variable belt drive means being controllable to provide an increase in the speed of the output shaft upon a decrease in the speed ratio therein when said second clutch means is engaged and one of said even numbered ratios is engaged.

3. A power transmission comprising in combination; an input shaft; an output shaft; a two-speed planetary gear arrangement having two simple planetary gear sets, one of said gear sets having two input members and one output member and the other of said gear sets having an input member, a rotating reaction member and an output member; drive means for continuously connecting the input shaft to one input member of the one planetary gear set and to the input member of the other planetary gear set; a variable ratio belt drive means continuously connected between the input shaft and the other input member of the one planetary gear set and the reaction member of the other planetary gear set; a pair of countershafts rotatably supporting a plurality of drive ratio gears; a plurality of output gears rotatable with said output shaft and each of the output gears meshing with one of the respecting drive ratio gears on each of said countershafts with the drive ratio gears being selectively connectible with the respective countershafts to establish a plurality of odd numbered ratios between one countershaft and the output shaft and a plurality of even numbered ratios between the other countershaft and the output shaft with the ratio of each odd numbered ratio and the subsequent even numbered ratio being numerically identical; first selectively engageable clutch means for connecting the output member of the one planetary gear set with the countershaft supporting the odd numbered ratios; second selectively engageable clutch means for connecting said output member of the other planetary gear set to the countershaft supporting the even numbered ratios; and a plurality of selective clutch means for individually providing the selective connection between respective drive gears and the supporting countershaft to selectively engage the odd and even numbered ratios, said variable belt drive means being controllable to provide an increase in the speed of the output shaft upon an increase in speed ratio therein when said input shaft is rotated at a fixed speed, said first clutch means being engaged and one of said odd numbered ratios being engaged by the respective selective clutch means, and said variable belt drive means being controllable to provide an increase in the speed of the output shaft upon a decrease in the speed ratio therein when said second clutch means is enagaged and one of said even numbered ratios is engaged.

* * * * *